(12) United States Patent
Hansen

(10) Patent No.: US 11,527,756 B2
(45) Date of Patent: Dec. 13, 2022

(54) RESISTANCE REDUCTION IN A BATTERY AND BATTERY MATERIALS

(71) Applicant: George Clayton Hansen, Midway, UT (US)

(72) Inventor: George Clayton Hansen, Midway, UT (US)

(*) Notice: Subject to any disclaimer, the term of this patent is extended or adjusted under 35 U.S.C. 154(b) by 0 days.

(21) Appl. No.: 17/340,063

(22) Filed: Jun. 6, 2021

(65) Prior Publication Data

US 2021/0391581 A1 Dec. 16, 2021

Related U.S. Application Data

(60) Provisional application No. 63/038,864, filed on Jun. 14, 2020.

(51) Int. Cl.
*H01M 4/62* (2006.01)
*H01M 4/02* (2006.01)

(52) U.S. Cl.
CPC ...... *H01M 4/626* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,143,445 A * | 11/2000 | Ferment | H01M 4/624 429/231.8 |
| 6,335,120 B1 * | 1/2002 | Bernard | H01M 4/624 429/223 |
| 9,356,320 B2 | 5/2016 | Shih et al. | |
| 2003/0036001 A1 | 2/2003 | James et al. | |
| 2006/0134525 A1 | 6/2006 | Kleijnen et al. | |
| 2008/0145755 A1 | 6/2008 | Iacovangelo et al. | |
| 2016/0351973 A1 | 12/2016 | Albano et al. | |

* cited by examiner

*Primary Examiner* — Laura Weiner
(74) *Attorney, Agent, or Firm* — Madson IP, P.C.

(57) ABSTRACT

The electrical resistance of active cathodic and anodic films may be significantly reduced by the addition of small fractions of conductive additives within a battery system. The decrease in resistance in the cathode and/or anode leads to easier electron transport through the battery, resulting in increases in power, capacity and rates while decreasing joules heating losses.

5 Claims, 5 Drawing Sheets

RESISTANCE REDUCTION IN A BATTERY AND BATTERY MATERIALS

RELATED APPLICATION

This patent application claims the benefit of U.S. Provisional Patent Application Ser. No. 63/038,864 that was filed on Jun. 14, 2020, for an invention titled RESISTANCE REDUCTION IN BATTERY MATERIALS, which is incorporated herein by this reference.

BACKGROUND OF THE INVENTION

1. Field of the Invention

The present invention relates to increasing the conductivity of battery cathodes and anodes to enhance battery performance. More specifically, the present invention relates to methods and systems for enhancing the performance of batteries by lowering the electrical resistance both across and particularly through the active films, thus increasing conductivity to increase discharge and charge rates, and ultimately to increase both power and energy density.

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "some embodiments," "various embodiments," and the like, may indicate that the embodiment(s) of the invention so described may include a particular structure, feature, property, or characteristic, but not every embodiment necessarily includes the particular structure, feature, property, or characteristic. Further, repeated use of the phrase "in one embodiment," or "in an exemplary embodiment," does not necessarily refer to the same embodiment, although they may.

2. The Relevant Technology

Among many other technologies, the preferred method to store electrical energy is in a battery. A battery is simply a device in which the anode (negatively charged or reducing electrode) may be loaded with electrons through an electrochemical galvanic process, and a cathode (positively charged or oxidizing electrode), where the electrochemical galvanic reaction is reversed and the stored electron is discharged to a circuit, thus providing an electrical current. Batteries where these reactions are singularly non-reversible are called primary batteries, which are non-rechargeable. Batteries where these reactions can be reversed multiple times are called secondary batteries, or rechargeable. Though the examples described in this disclosure are secondary in nature, those skilled in the art will understand that the concepts herein described may apply to both primary and secondary systems.

Battery design and choice of materials are a function of the galvanic potential between the materials and their ability to provide a designed voltage potential to drive a current to a circuit to supply electrical power.

An important part of the design of a battery is the method by which the electrical current is collected and distributed. While the examples described herein apply to a lithium-ion rechargeable battery, the concepts disclosed herein (methods and materials that significantly improve current collection) apply to all batteries, as all batteries generally use a current collector. For the purposes of this disclosure, all battery systems containing lithium will be identified as lithium-ion batteries. The choice of materials used to improve the current collection by methods described herein must be compatible with the electrochemical galvanic reactions of said battery, such that the selected materials do not become an active corrosion product of the battery.

For purposes of this disclosure, the exemplary embodiments described herein involve a lithium-ion secondary battery, specifically a lithium iron phosphate or a lithium nickel manganese cobalt oxide cathode and a carbon powder anode. However, one reasonably skilled in the art will understand that the concepts taught herein may apply to any battery where the materials, methods and techniques described would provide the described improvements.

There are many factors that influence battery performance, such as ion transport through both the anode and the cathode and across the separation barrier, chemistry kinetics, SEI (solid electrolyte interphase) formation, and so forth. A significant factor is the ability to transport the electrons through the system, that being a number of resistors in series; starting with the anode current collector foil, the anode foil/active mass interface, the anode active mass, to the electrolyte (in this case, the lithium accepting an electron at the anode when charging), transport of that electron and lithium across the barrier to the cathode, separation of the electron from the lithium in the cathode, transport of the electron through the cathode active mass, then to the active mass/foil interface, then moving the electron out of the foil and to the device it services.

In the lithium-ion battery system considered by example herein, current collection in the anode is inherently facilitated because the carbon powder that is used to capture and store the lithium ion during the charge cycle, is already moderately conductive. Its conductivity is often further enhanced by the addition of a finely divided carbon powder. Still, the anode film must be made thin (e.g., 50 to 100 microns thick) and must be applied to a copper or nickel foil current collector. Furthermore, its inherent volume resistivity is such that the rate by which it is charged is limited, in part, by its ability to run current both through the active mass and through the carbon/foil interface and polymer binder (another limiting factor is the ability to transport, accept and store lithium ions). The relationship of the voltage, current and resistance is defined by Ohms law. If the anode is more conductive, the electrical resistance is lowered, thus reducing the required applied voltage to run a given current, or conversely, to run a higher current at a given voltage. This reduction in resistance also results in reducing the resistive heating losses. Likewise, increased conductivity will permit thicker anodic film to be employed, thus increasing capacity.

Current collection in the cathode, however, is a different story, as many cathodic active materials are either non-conductors or poor conductors. In the exemplary embodiments described herein, the lithium iron phosphate (hereafter LFP) and the lithium nickel manganese cobalt oxide (hereafter NMC) are non-conductive insulators. However, typically, these materials are combined with small amounts of a polymer binder and a conductive sub-micron carbon and then spread thinly onto an aluminum foil substrate. For a given battery design, the cathode film is about twice the thickness of the anode film. In order that an adequate level of conductivity through the thickness of the non-conductive LFP or NMC is provided, a few percent of a moderately-conductive, finely divided carbon powder (such as Super P by name) is added to the mix. Still to put this into perspective, the volume resistivity of the cathode film is about one to two orders of magnitude less than the volume resistivity of the anode.

This vast difference in conductivity results in cathode resistance being the most prohibitive limiting factor for battery discharge rate or capacity. For instance, to get a higher discharge rate (power cell) the cathode must be made thinner so that the electron is more proximate to the current collecting foil. However, making the film thinner reduces the capacity of the battery. Conversely, the capacity of the battery may be increased by increasing the thickness of the cathode film, but then the discharge rate is commensurately reduced. Thus, one may design for power, or design for capacity, but not for both. If the cathode may be made significantly more conductive, then significant increases in capacity or power or a combination of both may be achieved.

The same design concepts also apply to the tradeoffs among thickness, capacity, and rate in the anode. Furthermore, any measure which increases the conductivity of the anode or the cathode will result in a lower resistance, or impedance, across the entire battery system, increasing the voltage or amperage, and also increasing either rate or capacity or both. An increase in conductivity also results in less joule heating. A decrease in Joule heating is a very important factor for two reasons. First, the reduction in Joule heating results in this energy being manifest in greater capacity. Second, reduce heating results in a cooler and safer battery.

Despite many recent advances in the ability of the battery industry to transport, store and chemically exchange lithium and its ion and electron, and advances in cathodic and anodic chemistry, the industry has not seen any significant advances in the electrical conductivity of the anode or cathode films for several decades.

Accordingly, a need exists for more efficient electrodes, electrodes that improve efficiency, discharge time, recharge rate, power density and energy density significantly without sacrificing weight or size. Such electrodes are disclosed herein.

SUMMARY OF THE INVENTION

The present disclosure describes developments responsive to the present state of the art, and in particular, a response to the problems and needs in the art that have not yet been fully solved by currently available electrodes. The electrodes of the present disclosure are easily implemented and provide significant advances in both power density and energy density. The exemplary electrodes may be used in batteries in a full range of sizes and weights for use in small electronic devices such as cell phones and laptop computers to electric vehicles such as golf carts and automobiles, to very large-scale centralized batteries for renewable energy storage, for example.

Improvements in conductivity in both the anode and the cathode are desirable and beneficial. The larger benefit comes from the ability to improve the conductivity of the cathode. Whereas the anode is moderately conductive, typically about 0.1 ohm-cm in volume resistivity; the cathode has a volume resistivity of about 1 to 10 ohm-cm. Due to the poor conductivity of cathodic films, the discharge energy capacity of the battery is limited by the inability of the cathode film to conduct electrons through its thickness to the aluminum foil current collector. Conversely, if more power is desired, then the film must be made thinner in order to facilitate faster electron transport to the foil, thus sacrificing capacity. Given a constant thickness, a more conductive cathodic film will result in a faster discharge rate. Alternatively, a film with less resistivity can be laid down thicker at an equal resistance, thus increasing capacity at the same power rate. Thus, the energy density may be increased approximately by the ratio of the thicknesses.

A significant improvement in the conductivity of either the anode or the cathode leads to lower resistivity, not only across or through the respective cathodic or anodic film, but also generally across the entire battery cell. As a result, a lower resistance leads to higher voltage to move a given current or move a higher current at a given voltage. This, in turn, leads to faster charging or discharging, or the ability to move an electron at greater ease through thicker films, thus increasing capacity. There will also be a decrease in Joule heating, with a corresponding reduction in temperature and in energy loss. A decrease in operating temperature also results in a more efficient and safer battery.

This disclosure describes various exemplary methods by which electrical conductivity of the cathode and/or the anode may be improved. The magnitude of the improvement may be by a fractional margin (e.g., such as 25% or 50%), or an integral margin, such as doubling, or tripling or better. This disclosure also describes improvements in the operation of a complete lithium-ion cell.

Also described in this disclosure are exemplary conductive additives for the anode and the cathode, and their respective effects on the performance of these members. Further, a battery cell fabricated from these materials is described. Although optimal performance is yet to be achieved, this disclosure clearly demonstrates the efficacy of these exemplary materials.

Furthermore, there may be evidence suggesting that the morphological changes wrought by adding some of these exemplary materials may facilitate ion transport. It is also postulated that the non-carbon surfaces of the highly conductive anode additives may inhibit SEI growth. However, at this point both of these concepts are postulated and are not claimed or exemplified herein.

Conductive Additives

The following exemplary materials were evaluated for increasing conductivity performance. It should be understood, this disclosure is not limited to only these exemplary materials and methods. Those skilled in the art, armed with the disclosures herein will understand that the exemplary materials described exemplify the broader concepts.

Metal-Coated Fibers

The addition of metal-coated fibers to either the anode or the cathode improves conductivity in both films. The metal may be any metal, and the fiber may be any fiber, so long as the chemical, physical and mechanical properties of the fiber and metal coating are compatible with each other and compatible with the respective properties of the selected anode or cathode. Minimization of fiber diameter, maximization of length, optimization of length vs dispersibility vs. efficacious concentration, minimization of density, and maximization of conductivity of the fiber are just a few of the highly interrelated properties to be considered.

Metal-coated fibers have been items of commerce for many decades. Many metals (nickel, silver, aluminum, gold, iron, copper, chromium, cobalt, molybdenum, to name a few) have been deposited onto a wide variety of fibers (carbon, surface-modified carbon, silicon carbide, silicate, borosilicate, alumina, basalt, quartz, aramid, acrylic, rayon, nylon, cotton, silk, to name a few). A smaller fiber diameter is better, as this increases the available length and specific surface area of fibers in a given unit weight and the available conductive surface area per unit weight for electronic interconnectivity.

Deposition processes for coating the fiber include vacuum processes (PVD, sputtering, evaporation, etc.), wet chemistry processes (electroplating, electroless plating) and Chemical Vapor Deposition (CVD). Though the general conductivity concepts taught in this disclosure are somewhat agnostic to the deposition method, some of these methods provide for better coating uniformity and control.

Other parameters have significance. For example, the choice of fiber (substrate) and the choice of metal (coating) must also be compatible with the chemistry of the battery system. The galvanic corrosion potential of the metal-coating with respect to the chosen ionic electrolyte must be greater than the operating voltage of the battery, for if it is less, it will prematurely galvanically corrode, as will be discussed below regarding Example 1. Additionally, the volume resistivity of the coated fiber must be less than that of the active film. The wider this improvement is, the greater the increase in performance. The length of the fiber also has importance. Fibers may be cut to very precise and consistent lengths, ranging from 0.1 mm to 1.0 mm. In addition, fibers also may be cut precisely to traditional lengths of several mm.

Dispersion efforts show that the precision consistency of fiber length greatly reduces the loading of fiber required for a desired conductivity, thereby reducing viscosity and dispersion issues. However, at concentrations high enough to achieve the desired conductivity, fibers that are above 1 mm in length may become entangled and may not disperse well. At the other end of the length spectrum, fibers that are 0.1 mm in length disperse very well, but their shorter aspect ratio mandates that higher loading is required for a desired conductivity. This added material loading adds weight and cost, but more importantly, displaces active battery materials, thereby commensurately reducing the available capacity.

The use of 0.5 mm fibers or fibers of about 0.5 mm are particularly suitable for dispersion, and that length may be adjusted upward or downward from 0.5 mm depending on other factors such as diameter or to facilitate dispersion. Although fibers, produced by any known means, may vary in length within the 0.1 mm to 1 mm range mentioned above, it is preferred to use precision-chopped fibers, wherein precision-chopped fibers means that the fibers are uniformly ±10% of the selected length (e.g., for 0.5 mm fibers, all fibers are between 0.45 and 0.55 mm). At that length, fibers may be dispersed in the active anode and cathode materials up to about 10% by weight. But in practice, dispersions above 5% are difficult to achieve, and dispersions above about 2% to 3% do not contribute to conductivity commensurate with their added weight, cost, or displacement of active material.

Listed below are various examples of metal-coated fiber additive candidates with descriptions of their relative efficacy as additives:

Carbon fibers—Carbon fibers, in either continuous woven, felt, or a chopped format have been the subject of extensive battery research, as a current collector, support member, or mechanical reinforcement. However, these fibers do not exhibit sufficient conductivity to achieve the desired objectives herein.

Nickel-coated carbon fibers—Nickel-coated carbon fibers are an item of commerce. Their small diameter, low density, high aspect ratio, high linear mass yield, excellent electrical conductivity and environmental stability all combine to provide an excellent conductivity network at very low loadings. However, as the corrosion of nickel against lithium occurs at 3.75 volts, and the lithium NMC cathode operates at 4.2 volts, the nickel on the fiber corrodes at 3.75 volts, and a battery thus made will not cycle, but will fail at 3.75 volts. However, in a lithium iron phosphate (LFP) battery, the maximum voltage is 3.6 V, and the operating voltage is closer to 3.2 V. Thus (as will be shown in the examples) the nickel-coated fiber works well. For the NMC system, a metal which survives above 3.75 V against lithium is required to operate up to 4.2 V. Fortunately, aluminum against lithium reacts at 4.7 V. Thus, it will be shown in the examples that an aluminum-coated fiber operates within the NMC system. The lesson here is that the electrical potential voltage of the conducting metal compared to the electrolyte ion must be above the operating voltage of the element, whether it be the cathode or the anode. Thus, a nickel-coated fiber is predicted to fail in a lithium-ion cathode but succeed in a lithium-ion anode. Such will be the cases illustrated in a few of the examples below. Where cathode operating voltages are low enough, the use of the nickel materials described in this disclosure would be a valid path to reduction in resistivity.

Aluminum-coated fibers—In a lithium-ion battery, the use of an aluminum-coated fiber is a good choice because the lithium/aluminum reaction occurs at 4.7 volts, and a corrosive reaction will not be reached until 4.7 volts. Using a lithium NMC cathode operating at 4.2 volts will not react corrosively. Testament to this is that the current collector in a lithium-ion battery is made from aluminum foil.

Many types of aluminum-coated fiber may be contemplated. Aluminum is coated onto fibers and fabrics usually through a vacuum process or melt process. Applications for these products are usually optical in nature, such as a reflector (optical fibers or mylar balloons) or as a reflector of heat (gloves for high temperature processes). These have been items of commerce for decades. However, these fibers are large in diameter (usually over 25 microns) and have a density of about 2.7 g/cc. Though they could be a viable candidate, their large diameter and moderate density results in a linear yield that is less than desirable.

Aluminum-coated carbon fiber—As the carbide of aluminum is easily formed, an aluminum-coated carbon fiber is not a viable option.

Aluminum coating over nickel coating on carbon fiber—If a barrier is placed between the carbon and aluminum, such as a nickel film or coating, the aluminum may be deposited as a thin film over the nickel. This is shown in a successful example below. However, after about a week of cycling, the nickel begins to react with the lithium and the battery fails.

Aluminum-coating onto other fibers. Any fiber that will not form a carbide during or after deposition or is already a carbide at least at its surface is a candidate for aluminum deposition. The aluminum deposition is deposited by chemical vapor deposition from any aluminum bearing organometallic compound. Examples of aluminum-coated fibers that have been demonstrated include fibers of silicon carbide, silicate, alumina, aluminum borosilicate, basalt, quartz, aramid, and so forth. Each of these fibers have been demonstrated to readily accept a thin aluminum film, but this list is by no means exhaustive. Hence the fiber (substrate) of an aluminum-coated fiber may be selected from the group including carbon, pan ox, silica, quartz, silicates, alumina, aluminosilicates, borosilicates, glass, minerals, carbides, nitrides, borides, polymers, cellulose, inorganic fibers, and organic fibers.

Surface modification of carbon fiber. The surface of a carbon fiber may be modified to a silicon carbide, after which the aluminum readily coats onto the silicon carbide surface. This fiber provides the smallest diameter and lowest density approach.

Other metal-coated fibers—Such metal-coated fibers have been demonstrated as useful, such as copper-coated carbon fibers.

Powders and filamentary branching metals—In the cases where nickel is active employed for the conductivity, such as in the lithium-ion anode or the LFP cathode, certain types of nickel powders may act to provide further electrical paths between the metal-coated fibers or act to provide multiple conductive paths through the active mass/polymer/foil current collector interface. The synergistic effects of adding other conductive solid shapes, such as platelets or spheres, are known to increase the interconnectivity between the metal-coated fibers. In one particularly advantageous method, nickel powder of a highly filamentary and branched structure, where the main branches of the structure are generally above a micron in diameter, with some branching (such as Inco type 255 powder) may be used. A filamentary branching metal known as "nanostrands" generally has branches below a micron in diameter and exhibits very extensive branching ("nanostrands" are available from Conductive Composites Company of Heber City, Utah).

By using a combination of additives such as metal-coated fiber and a filamentary branching structure such as a branching nickel powder or nanostrands, the metal-coated fiber and the high-aspect ratio, conductive filamentary structures work together to create a comprehensive network of electron transport pathways. The physical nature of metal-coated fibers and the high-aspect ratio, conductive filamentary structure(s) facilitate the creation of an inter-fiber electron transport network for moving electrons between the anode and the current collector interface. The metal-coated fibers act much like logs being elongated linear electron transport conduits and the conductive filamentary structures act much like tumbleweeds that electrically interconnect the logs.

When such a combination of additives is used on the anode, anode conductivity is further enhanced. Whereas the carbon powder of the anode is already somewhat conductive, the spaces between the filamentary network of the conductive filamentary branching structure is about the same dimension and geometry as the carbon powder particle size. Consequently, the filamentary branching structures somewhat three-dimensionally wrap themselves around the carbon particles, like a spider web or a net (hereinafter referred to as a "nanonet"). This "nanonet" phenomenon leads to a much greater level of electrical interconnectivity between the carbon particles, the filamentary branching structures, the metal-coated fibers, and the current collecting foil. This effect is more pronounced for the nanostrands, due to their smaller diameter and larger degree of branching.

The amount of metal coating on the fiber is an important parameter in modifying conductivity, as will be demonstrated in the examples provided below in the Detailed Description.

These and other features of the exemplary embodiments of the present invention will become more fully apparent from the drawings, examples, and the following description, or may be learned by the practice of the invention as set forth hereinafter.

BRIEF DESCRIPTION OF THE DRAWINGS

Exemplary embodiments of the present invention are described more fully hereinafter with reference to the accompanying drawings, in which multiple exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the arrangements disclosed are meant to be illustrative only and not limiting the scope of the invention, which is to be given the full breadth of the appended claims and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items but does not exclude a plurality of items of the list. Additionally, the terms "operator", "user", and "individual" may be used interchangeably herein unless otherwise made clear from the context of the description.

Figure 1:
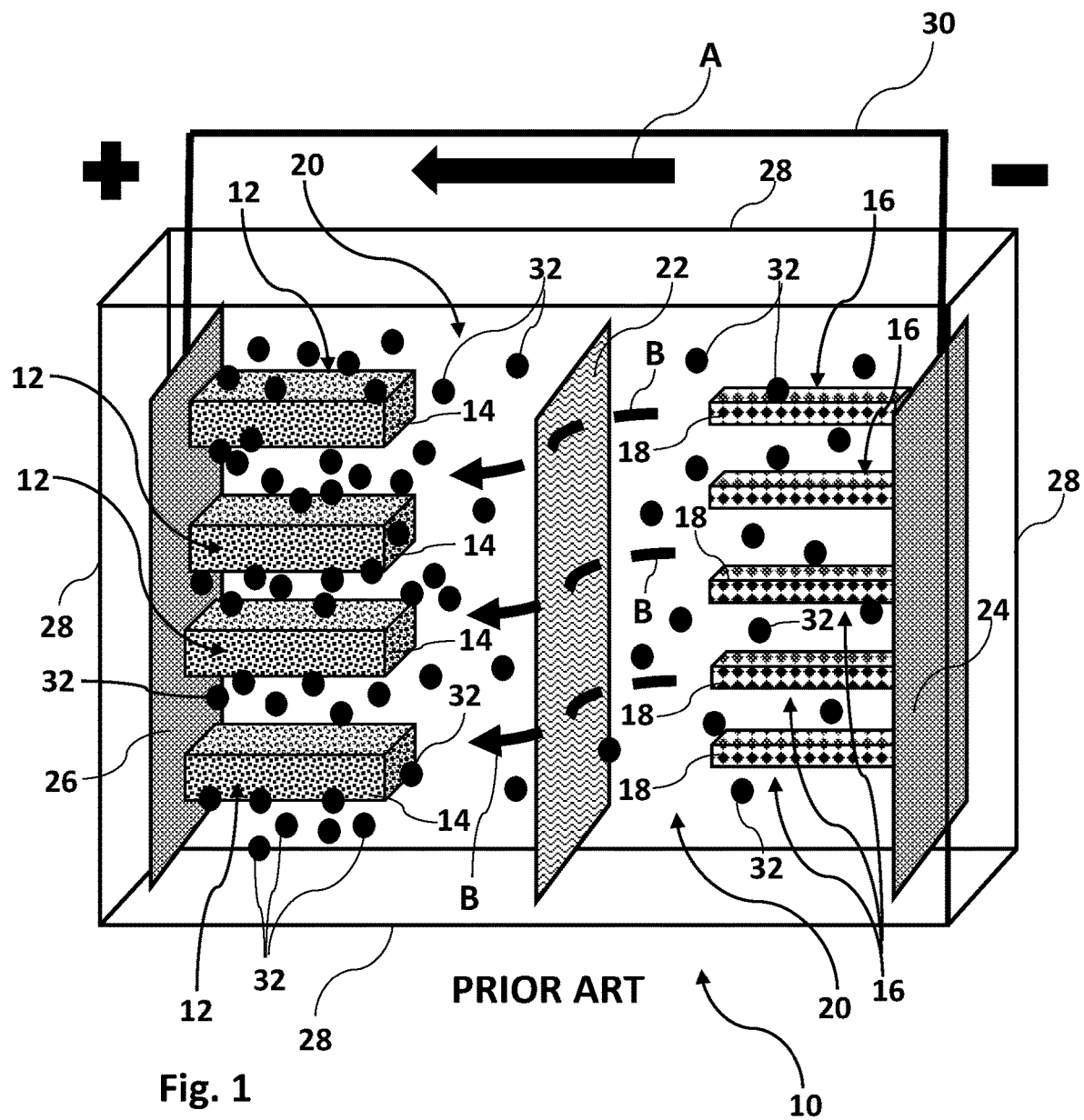

The drawings are schematic depictions of various components and embodiments and are not drawn to scale. Schematic depictions are being used in this application to assist in the understanding of relative relationships between the components. Understanding that these drawings depict only typical exemplary embodiments of the invention and are not therefore to be considered limiting of its scope, the invention will be described and explained with additional specificity and detail with reference to the accompanying drawings in which:

FIG. 1 is a schematic depiction of an exemplary embodiment of a discharging lithium-ion battery as generally known in the prior art.

Figure 2:
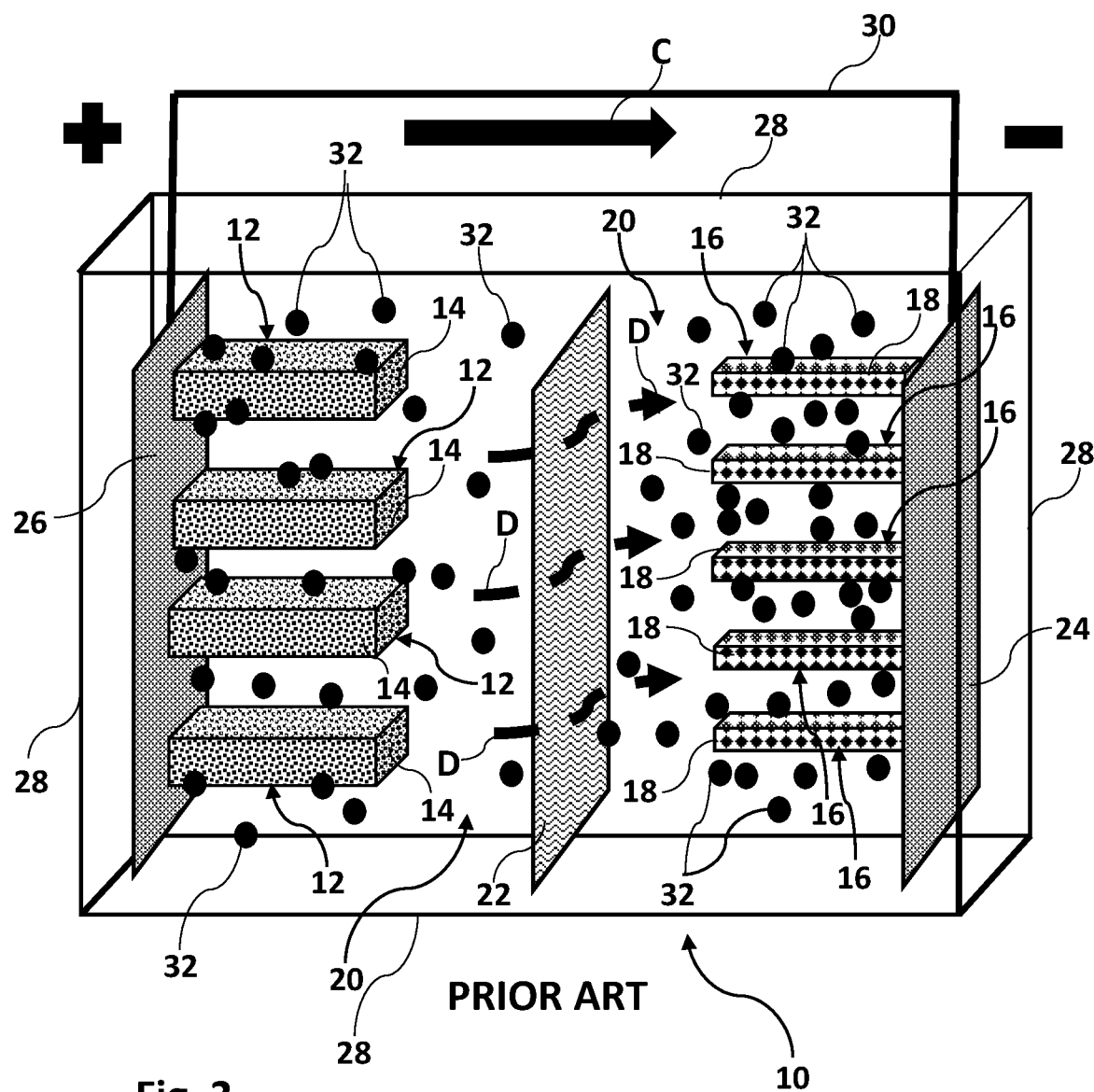

FIG. 2 1 is a schematic depiction of the exemplary embodiment of the lithium-ion battery of FIG. 1 during recharging as generally known in the prior art.

Figure 3:
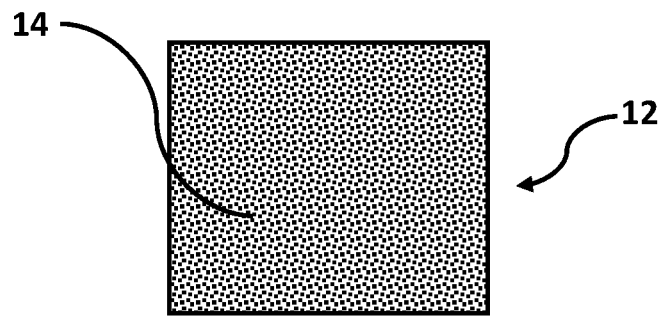

FIG. 3 is a representative depiction of a portion of an exemplary embodiment of a cathode as generally known in the prior art showing an active base cathode material.

Figure 4:
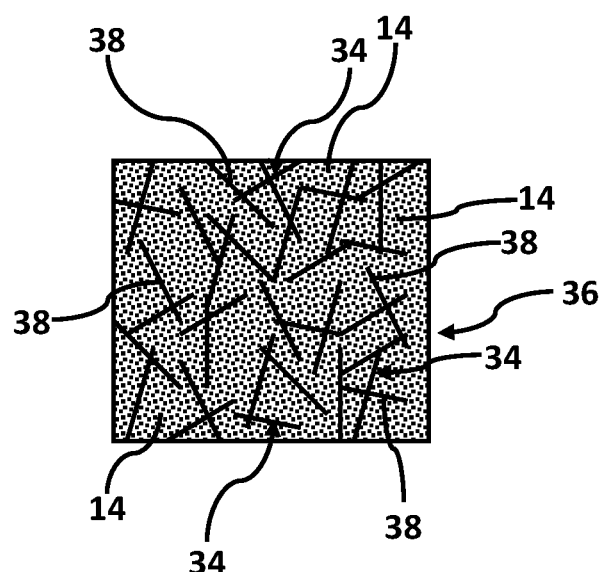

FIG. 4 is a representative depiction of a portion of an exemplary embodiment of an enhanced cathode showing metal-coated fiber additive dispersed throughout the active base cathode material of FIG. 3.

Figure 5:
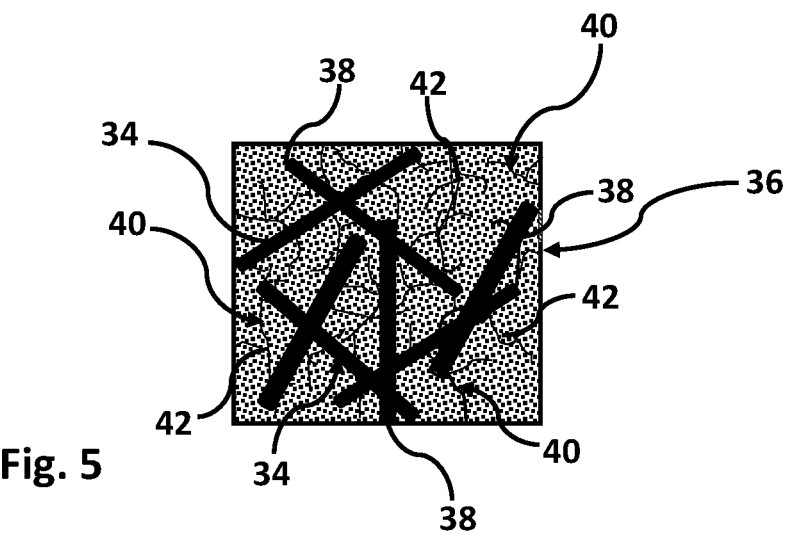

FIG. 5 is a representative depiction of a portion of an exemplary embodiment of an alternative enhanced cathode showing metal-coated fiber additive and conductive filamentary structure additive dispersed throughout the active base cathode material of FIG. 3.

Figure 6:
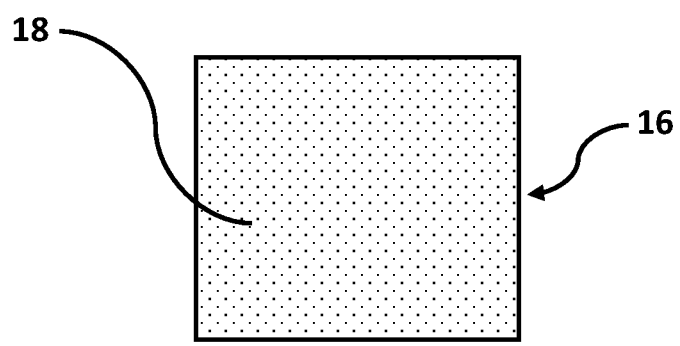

FIG. 6 is a representative depiction of a portion of an exemplary embodiment of an anode as generally known in the prior art showing an active base anode material.

Figure 7:
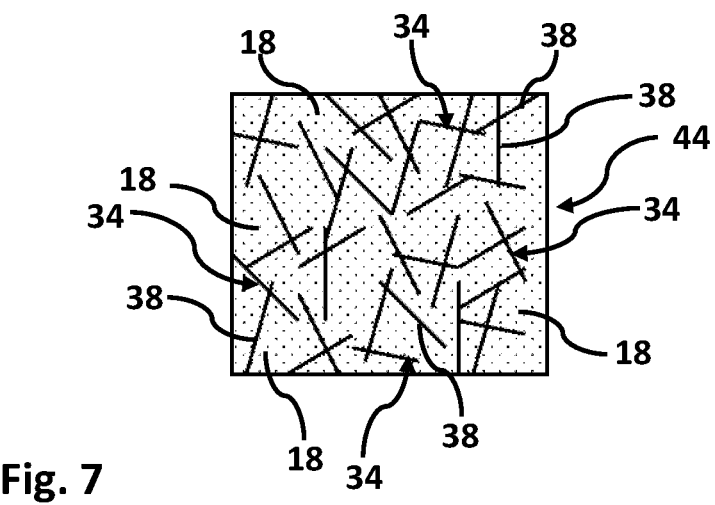

FIG. 7 is a representative depiction of a portion of an exemplary embodiment of an enhanced anode showing metal-coated fiber additive dispersed throughout the active base anode material of FIG. 6.

Figure 8:
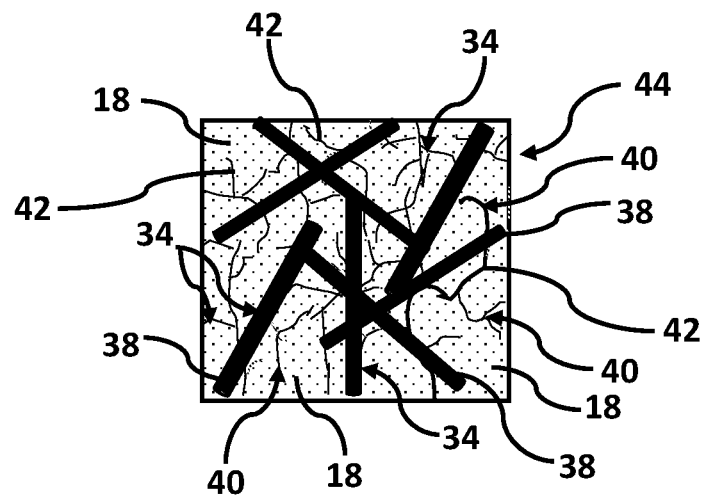

FIG. 8 is a representative depiction of a portion of an exemplary embodiment of an alternative enhanced anode showing metal-coated fiber additive and conductive filamentary structure additive dispersed throughout the active base anode material of FIG. 6.

REFERENCE NUMERALS

| | |
|---|---|
| lithium-ion battery or battery 10 | standard cathode or cathode 12 |
| active base cathode material 14 | standard anode or anode 16 |
| active base anode material 18 | electrolyte 20 |
| separation barrier 22 | anode current collector foil 24 |
| cathode current collector foil 26 | battery housing 28 |
| schematic flow path 30 | lithium ions 32 |
| additive(s) 34 (comprising 38, 42) | enhanced cathode 36 |
| metal-coated fiber additive 38 | high aspect ratio conductors 40 |
| conductive filamentary structure additive 42 | enhanced anode 44 |
| Arrow A (discharging direction) | Dashed Arrow B (discharging direction) |
| Arrow C (charging direction) | Dashed Arrow D (charging direction) |

DETAILED DESCRIPTION OF THE INVENTION

The exemplary embodiments of the present disclosure will be best understood by reference to the drawings, wherein like parts are designated by like numerals throughout. It will be readily understood that the components of the exemplary embodiments of the present invention, as generally described and illustrated in the figures and examples herein, could be arranged and designed in a wide variety of different arrangements. Thus, the following more detailed description of the exemplary embodiments, as represented in the figures and examples, is not intended to limit the scope of the invention, as claimed, but is merely representative of exemplary embodiments of the disclosure.

This detailed description, with reference to the drawings, describes a representative rechargeable lithium-ion battery 10 as known in the prior art that operates with a standard cathode 12 made of an active base cathode material 14 and a standard anode 16 made of an active base anode material 18. The exemplary embodiments of the present invention comprise modified electrodes with increased conductive that separately or together may be components of an enhanced battery.

Turning to FIG. 1, a representative rechargeable lithium-ion battery 10 as known in the prior art is depicted schematically. The lithium-ion battery 10 comprises the standard cathode 12 made of the active base cathode material 14, the standard anode 16 made of the active base anode material 18, an electrolyte 20, a separation barrier 22, an anode current collector foil 24, and a cathode current collector foil 26 encased within a battery housing 28. The active base cathode material 14 may be any of many cathode compounds known to be of use in batteries; however, for the purposes of this description, the battery 10 is a lithium-ion battery 10 and exemplary active base cathode materials 14 may include lithium iron phosphate (LFP) and the lithium nickel manganese cobalt oxide (NMC) and any other cathode material used in lithium-ion batteries. The active base anode material 18 may be any of the anode materials known to be of use in batteries; however, for the purposes of this description, the battery 10 is a lithium-ion battery 10 and exemplary active base anode materials 18 may include carbon power, graphite powder, and any other cathode material used in lithium-ion batteries. Such compounds also contain a small amount of a polymer used as a binder. Also, the most used electrolyte 20 in lithium-ion batteries 10 is lithium salt, such as LiPF6 in an organic solution. The key role of the electrolyte 20 is transporting positive lithium ions between the cathode 12 and anode 16.

The battery 10 operates to transport electrons through the system of components. In FIG. 1, in the discharging mode the electron transport starts with the anode current collector foil 24, then through the anode foil/active mass interface to the anode active mass (in this case, the standard anode 16). The discharging direction of electron flow (shown by schematic flow path 30) is shown generally at Arrow A from negative to positive. Positively charged lithium ions 32 travel within the electrolyte 20 (in this case, the lithium accepting an electron at the standard anode 16 when charging), that electron and lithium (of the lithium ions 32) pass across the separation barrier 22 (as shown by Dashed Arrows B) to the standard cathode 12. Separation of the electron from the lithium (of the lithium ions 32) occurs in the standard cathode 12. The electron is transported through the cathode active mass (standard cathode 12) to the active mass/foil interface then moves the electrons out of the cathode current collector foil 26 to the device it services.

FIG. 2 shows the battery 10 of FIG. 1 during charging. The charging direction of electron flow (shown by schematic flow path 30) is reversed as shown generally at Arrow C from positive to negative. Positively charged lithium ions 32 travel within the electrolyte 20 from the standard cathode 12 passing across the separation barrier 22 (as shown by Dashed Arrows D) to the standard anode 14.

Significant improvement in the conductivity of either the anode or the cathode or both leads to lower resistivity, not only across or through the respective cathodic or anodic film, but also generally across the entire battery cell. As a result, a lower resistance leads to higher voltage to move a given current or move a higher current at a given voltage. This, in turn, leads to faster charging or discharging, or the ability to move an electron at greater ease through thicker films, thus increasing capacity. There will also be a decrease in Joule heating, with a corresponding reduction in temperature and in energy loss. A decrease in operating temperature also results in a more efficient and safer battery.

Described in this disclosure are exemplary conductive additives 34 (see FIGS. 4, 5, 7, and 8) for the anode 16 and the cathode 12 that significantly improve conductivity enhancing the performance of these components 12, 16 and the battery 10 within which they are used. By dispersing some of these exemplary additives 34 within the active base cathode material 14 and/or the active base anode material 18, the resultant, enhanced cathode 36 and/or enhanced anode 44 exhibit increased conductivity and ion transport within the battery system is facilitated. It is also postulated that the non-carbon surfaces of the highly conductive anode additives may inhibit SEI growth.

FIG. 3 is a representative depiction of a portion of an exemplary embodiment of a cathode 12 as generally known in the prior art showing an active base cathode material 14 from which the cathode 12 is made. As noted above, the active base cathode material 14 may be any of many cathode compounds known to be of use in batteries.

An exemplary embodiment of an enhanced cathode 36 showing metal-coated fiber additive 38 dispersed throughout the active base cathode material 14 is depicted in FIG. 4. The depiction of FIG. 4 is not drawn to scale, nor does it suggest any specific level of loading. Rather, the depiction is merely intended to give context to the dispersion of metal-coated fiber additive 38 within the active base cathode material 14.

FIG. 5, a magnification compared to FIG. 4, depicts an alternative exemplary embodiment of the enhanced cathode 36 showing metal-coated fiber additive 38 and conductive filamentary structure additive 42 (which are high aspect ratio conductors 40) dispersed throughout the active base cathode material 14. The structures of the conductive filamentary structure additive 42 are smaller than the fibers of the metal-coated fiber additive 38 in at least one material physical aspect, such as diameter, weight, or volume and may also exhibit branching. The electrical conductivity between the conductive metal-coated fibers additive 38 is further enhanced by the addition of the conductive filamentary structures additive 42. Again, the depiction of FIG. 5 is not drawn to scale, nor does it suggest any specific level of loading. Rather, the depiction is merely intended to give context to the dispersion of metal-coated fiber additive 38 within the active base cathode material 14.

FIG. 6 is a representative depiction of a portion of an exemplary embodiment of an anode 16 as generally known in the prior art showing an active base anode material 18 from which the anode 16 is made. As noted above, the active base anode material 16 may be any of the active anode materials known to be of use in batteries.

An exemplary embodiment of an enhanced anode 44 showing metal-coated fiber additive 38 dispersed throughout the active base anode material 18 is depicted in FIG. 7. The depiction of FIG. 7 is not drawn to scale, nor does it suggest any specific level of loading. Rather, the depiction is merely intended to give context to the dispersion of metal-coated fiber additive 38 within the active base anode material 18.

FIG. 8, a magnification compared to FIG. 4, depicts an exemplary embodiment of an alternative enhanced anode 44 showing metal-coated fiber additive 38 and conductive filamentary structure additive 42 (which are high aspect ratio conductors 40) dispersed throughout the active base anode material 18. The structures of the conductive filamentary structure additive 42 are smaller than the fibers of the metal-coated fiber additive 38 in at least one material physical aspect, such as diameter, weight, or volume and may also exhibit branching. The electrical conductivity between the conductive metal-coated fibers additive 38 is further enhanced by the addition of the conductive filamentary structures additive 42.

EXAMPLES

Following are a few representative examples that demonstrate the concepts and advancements disclosed herein:

Fiber Choice (Examples 1 Through 3)

Example #1—Nickel-coated carbon fiber in a cathode. A nickel-coated carbon fiber (7 microns diameter, with 40% nickel coating, or 0.25 micron thick, precision chopped to 0.50 mm) provided excellent conductivity in the cathode. Adding 2% by weight of the described fiber moved the through thickness resistance of a 100 microns film from 3.5 ohms (no fiber) down to 1.5 ohms (2% fiber). However, the lithium-ion coin cells made from these films would not cycle. It was discovered that the cell corroded at 3.75 volts, before reaching the 4.2 volts operating condition. This is because the half-cell potential of nickel and lithium is 3.75 volts. However, this did demonstrate that the conductivity could be greatly improved and suggested that the nickel-coated fiber should work in systems that remain below about three and a half volts (see anode examples below).

Example #2—Aluminum-coated fiber. The half-cell potential of aluminum and lithium is 4.7 volts. Thus, an aluminum-coated fiber should survive a cathode having a 4.2 volt operating voltage lithium. In this case, a 0.2 microns coating of aluminum was plated over a 0.1 microns coating of nickel on a carbon fiber. The dually coated fiber was chopped to 0.50 mm length. When this fiber was added to the cathode at 2%, by weight, the cell was able to successfully cycle for about a week, before the underlying nickel entered into the reaction. When these cathode films were produced, the standard cathode (made of an active base cathode material) was 90 microns thick and the fiber-loaded cathode (active base cathode material metal-coated fiber loaded) was 110 microns thick. This could likely be because the added fibers added support and drag to pull a slightly thicker film. The table below compares the thickness, resistance, voltage and capacity of these two cells. (Each value is the average of three samples).

| film | Thickness microns | Resistance | Voltage | Capacity mAhr |
|---|---|---|---|---|
| standard | 90 | 0.86 ohm | 3.5 V | 3.29 |
| 2% Al on Ni on carbon fiber | 110 | 0.86 ohm | 3.5 V | 4.05 |
| difference | +123% | same | same | +123% |

Note that the fiber loaded film is 23% thicker than the standard film but exhibits the same resistance and same voltage as its thinner parent. Thus, the capacity of the fiber-loaded film was increased by 23%. The implication is a higher capacity at the same rate (resistance driven), or a higher rate at equal capacity.

Example #3—Process of coating fibers with CVD aluminum. Any of the previously mentioned fibers have been coated by an aluminum CVD (chemical vapor deposition) process, precision chopped to 0.5 mm and added to the cathode. Fiber examples include (but are not limited to) silicon carbide, borosilicate, quartz, mineral (basalt), surface modified carbon and organic (aramid-Kevlar). In each of these cases, the addition of 1% to 4% of the precision chopped, aluminum-CVD coated fiber improved the conductivity of the coating by values similar to that of Example #1 above. Each of these fibers will add certain advantages, or disadvantages, unique to that particular fiber, but they all work to improve the conductivity of the cathode.

Cathodes (Example 4)

Example #4— Aluminum-coated fibers precision chopped to 0.5 mm. These coated fibers were dispersed into a standard cathode mix at 3% by weight (always reserving a portion of the mix for a control). This was repeated several times, the largest variable being a batch to batch or fiber type variation in the aluminum-coated fiber conductivity.

Films were extruded onto aluminum foil with a doctor blade, the height of the blade being adjusted to achieve a consistent film thickness and weight, depending on the desired thickness and the solvent-to-solids ratio of the mix. After drying, the uncalendared films were tested for volume resistivity per ASTM Method D2739. The table below reports several of these comparative batches.

| Sample | Volume resistivity control ohm-cm | Volume resistivity modified ohm-cm | Improvement |
|---|---|---|---|
| A | 1750 | 615 | 2.8× |
| B | 2215 | 687 | 3.2× |
| C | 1617 | 413 | 3.9× |
| D | 2175 | 790 | 2.8× |

With sample set D, the samples were calendared and measured for composite Volume Resistivity (CVR) and interface resistivity (IR).

|  | CVR | IR |
|---|---|---|
| control | 15.4 | 1.06 |
| modified | 12.5 | 0.50 |
| improvement | 1.2× | 2.1× |

Example #5—Higher fiber loading in cathode. A standard cathode mixture was loaded with 3%, 4%, 5% and 6% of 0.5 mm precision chopped, nickel-coated fiber having a 40% nickel coating (250 nm thickness). Attempts to mix above 6% resulted in poor dispersion. However, the following table illustrated the improvement in through thickness volume resistivity when films of equal thickness were pulled from these mixtures.

Volume resistivity of cathode films modified with precision-chopped nickel-coated carbon fiber at 40% nickel and 0.5 mm length.

| Weight percent of fiber added | Volume resistivity ohm-cm |
|---|---|
| 0% (standard film) | 43.6 |
| 3% | 6.55 |
| 4% | 1.30 |
| 5% | 0.90 |
| 6% | 0.69 |

Example #6—Effect of percent nickel coating on the fiber. In the same experiment as Example #5, one sample was made with 75% nickel coating on the fiber, resulting in four times the weight and thickness of nickel on the fiber (carbon fiber) (base weight is 0.76 gm/meter, while the 40% is 1.28 gm/meter, and the 75% is 3.00 gm/meter). The density of the 40% nickel-coated fiber is 2.6 gm/cc, while the density of the 75% nickel-coated fiber is 5.5 gm/cc. For this example, the objective was to add a volume consistent with that representative of the 40% nickel-coated fiber loading. The loading weight range for 75% nickel-coated fiber may range up to 15%, but for this example 10% by weight was chosen, which is equivalent to the fiber volume loading of 4.8% of the 40% nickel-coated fiber. At this loading, the dispersion went well and the film pulled well. But the through thickness volume resistivity of this film was an outstanding 0.40 ohm-cm, almost double that the best loading of the 40% nickel-coated fiber. This higher conductivity and nickel loading will result in greatly improved performance, but furthermore, will have improved current capability, making it more appropriate for power cells.

Anodes (Examples 7, 8 and 9)

Example #7—Anode with copper-coated carbon fibers. Because the current collector of the anode is copper foil, copper may be a viable candidate for anode improvement. In this example, up to 8% of a copper-coated carbon fiber was added to the anode. The copper coating is 40% by weight on an AS4 fiber. The copper coated carbon fiber was obtained from Technical Fiber Products of Schenectady, N.Y., and precision chopped to 0.50 mm length. The resistivity of the resulting anode was reduced from 253 ohms to 112 ohms, or a 220% improvement in the conductivity. As a result, the voltage of the anode was reduced from 1.0 ohm down to 0.8 ohm. This lower voltage implies a higher capacity at a given charge rate, or alternatively, a higher charge rate.

Example #8—Anode with precision-chopped, nickel-coated carbon fiber (NiPCF). Nickel is also a viable element for inclusion into the anode. Precision-chopped, nickel-coated carbon fibers were obtained from The Conductive Group, Heber City, Utah. The nickel coating was 40% by weight, or 0.25 microns thickness, on an AS4 carbon fiber. Remembering that the anode is already composed of conductive graphite powder, the addition of the NiPCF alone either at 5% by weight or even 10% by weight, did little to significantly improve the conductivity (either the CVR or the IR) of the anode film. Some samples showed no statistically significant improvement, while some others showed perhaps about a 25% improvement. These improvements are considered marginal.

Example #9—Anode with filamentary branching structures. Nickel powders produced by chemical vapor decomposition may be produced in two distinct geometrical classes; either spherical (type 1 powders) or filamentary (type 2 powders). Type 1 powders are of little use in increasing conductivity until loadings are exceptionally high, due to the need for the particles to come in close contact to each other. However, the filamentary powders become conductive at lower loadings due to the higher aspect ratio, and in part due to filamentary powders generally exhibiting some degree of branching. These powders in larger diameter format (generally above one micron in diameter of the main branch) are available through Vale or Novamet, notably as Type 255 powder (and its derivatives). Nanostrands are a filamentary branching metal having a smaller diameter with more extensive branching. Nanostrands are available from The Conductive Group, Heber City, Utah.

The type 255 powder alone did little to increase the conductivity of the system. However, the nanostrands did show a significant increase in the conductivity of the anode mix.

Of interest are the combinations of the NiPCF fibers with the filamentary branching structures, forming a so called "logs and tumbleweeds" network.

The following table compares the CVR and IR of standard anode films to that of 5% NiPCF, 5% type 255, 5% nanostrands, and 5%+5% NiPCF/255 and 5%+5% NiPCF/nanostrands:

| Additive | CVR | Percent improvement compared to standard | IR | Percent improvement compared to standard |
|---|---|---|---|---|
| Standard - carbon powder only | 0.77 | 0% | 0.60 | 0% |
| Ni PCF fiber 5% | 0.91 | −15% | 0.57 | +6% |
| Type 255 powder (est.) | 1.0 | −29% | 0.40 | +50% |
| Nanostrands (est.) | 0.77 | 0% | 0.28 | +115% |
| NiPCF plus type 255 | 0.65 | +19% | 0.28 | +115% |
| NiPCF plus nanostrands | 0.66 | +18% | 0.11 | +447% |

It is noted that the CVR of individual additives seem to not be very effective, but the combinations do move the CVR somewhat. They all have some effect on the IR, some very significant. This is likely because none of the additives individually are much more conductive than the carbon powder. But the "logs and tumbleweeds" provides a more complex electron transport opportunity. The IR, the interfacial resistance, suggests that the combinations of additives multiple paths directly to the underling foil across the ever-present polymer binder barrier. Calendaring likely provides additional physical impression of the conductors into the foil.

It has been observed that the filamentary branching structures (tumbleweeds) not only provide a multiplicity of high aspect ratio paths to the nickel-coated fibers (logs), but they also tend to lay on, or tend to touch the carbon particles in multiple places (each such touching hereinafter being referred to as a "touch point"). With the more open and branched nanostrands, they tend to wrap themselves around and envelop the carbon particles, like a spider web or net, creating a nanonet and exhibiting a multiplicity of touch points. It is this fashion of multiple touching and nanonetting that adds significantly more conduction opportunities. It becomes a "logs and tumbleweeds and nanonet" model and is structured uniquely in its ability to collect current at higher rates, higher amperages, and lower voltages.

The NiPCF/nanostrands sample was chosen to be the anode, and along with the cathode described near the end of Example 4, were used to fabricate an experimental pouch cell battery.

Pouch Cell Batteries (Examples 10 and 11)

Example #10— Modified anode with standard cathode. A control pouch cell was fabricated using a standard cathode and a standard anode. A second pouch cell was constructed using a standard cathode and a nickel-coated fiber modified anode. The standard anode had a CVR and IR values of 0.12 and 0.10 ohm, respectively. The modified anode had a CVR and IR of 0.065 and 0.0081, respectively. Thus, the CVR and IR of the modified anode were improved by 1.9× and 12.3×, respectively. As a result of the improved conductivity, the capacity at various discharge rates is shown in the following table:

| Anode | type | Control cell standard | Modified cell NiPCF plus nanostrands | Improvement |
|---|---|---|---|---|
| | CVR-ohm | 0.12 | 0.065 | 190% |
| | IR-ohm | 0.10 | .0081 | 1230% |

| Cathode | type | Control cell standard | Modified cell standard | Improvement |
|---|---|---|---|---|
| | CVR-ohm | 12 | 12 | same |
| | IR-ohm | 0.2 | 0.2 | same |
| 2 C capacity | mAhr | 7 | 12.5 | 179% |
| 10 C capacity | mAhr | 2.1 | 2.7 | 129% |
| 20 C capacity | mAhr | 1.4 | 1.8 | 129% |

It is believed that this is due to the conductivity network of the previously described logs and tumbleweeds and nanonets, such structures more efficiently collect and transport the electrons. It has also been observed that the logs and tumbleweeds create a more open structure. Hence, it is likely that easier and more pathways for lithium-ion transport are being created.

Example #11—Modified cathode with standard anode. For this example, pouch cells were constructed with standard anodes and lithium iron phosphate cathodes. The control cell used a standard lithium iron phosphate cathode, while the second cell used a cathode with 3% (wt %) loading of the 40% nickel-coated carbon fiber, precision chopped to 0.5 mm in length, given the results of Example #5, this is a rather conservative loading.

The following table lists the discharge voltage and capacity of these cells at various discharge rates.

| parameter | Standard cell | Modified cathode | |
|---|---|---|---|
| Cathode coat weight | 200 gm/sq. meter | 180 gm/sq meter | |
| Cell impedance | 927 mohm | 835 mohm | 11% lower resistance |
| C/20 discharge Voltage | 3.3 V | 3.3 V | Same voltage |
| c/20 discharge capacity mAHr | 162 mAHr | 156 mAHr | 3% lower capacity |
| 1 C discharge Voltage | 2.95 V | 3.00 V | 0.05 V better |
| 1 C discharge capacity mAHr | 84 mAHr | 96 mAHr | 14% more capacity |
| 2 C discharge Voltage | 2.75 V | 2.85 V | 0.10 V better |
| 2 C discharge capacity mAHr | 44 mAHr | 50.5 mAHr | 14% more capacity |

This data shows that the addition of even modest quantities of the conductive fibers to the cathode will lower the resistance and impedance simultaneously, permitting higher voltages or current flow, or both.

For exemplary methods or processes of the invention, the sequence and/or arrangement of steps described herein are illustrative and not restrictive. Accordingly, although steps of various processes or methods may be shown and described as being in a sequence or temporal arrangement, the steps of any such processes or methods are not limited to being carried out in any specific sequence or arrangement, absent an indication otherwise. Indeed, the steps in such processes or methods generally may be carried out in different sequences and arrangements while still falling within the scope of the present invention.

Additionally, any references to advantages, benefits, unexpected results, preferred materials, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under Section 112 is not intended. Additionally, it is not intended that the scope of patent protection afforded the present invention be defined by reading into any claim a limitation found herein that does not explicitly appear in the claim itself.

While specific embodiments and applications of the present invention have been described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

Those skilled in the art will appreciate that the present embodiments may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A battery cathode with enhanced electrical conductivity for use in a battery, the battery cathode comprising:
   an active base cathode material comprising lithium iron phosphate; and
   at least one additive dispersed within the active base cathode material creating a dispersed mixture, the at least one additive comprising:
      a first additive comprising a plurality of nickel-CVD coated fibers having a diameter of from 3 microns to 20 microns, a nickel-coating thickness between 0.1 micron and 3 microns; and a fiber length of from 0.1 mm to 1.0 mm; and
      the first additive is dispersed into the active base cathode material in a loading weight range 1% of up to 15% of the active base battery cathode material.

2. The battery cathode of claim 1, wherein each fiber of the plurality of nickel-CVD coated fibers is selected from the group of materials consisting of carbon, pan ox, silica, quartz, silicates, alumina, aluminosilicates, borosilicates, glass, minerals, carbides, nitrides, borides, polymers, cellulose, inorganic fibers, and organic fibers.

3. The battery cathode of claim 1, wherein the battery cathode further comprises a second additive comprising conductive nickel-filamentary branching structures, the conductive nickel-filamentary branching structures are selected from the group consisting of branching nickel power and nickel nanostrands.

4. A battery cathode with enhanced electrical conductivity for use in a battery, the battery cathode comprising:
   an active base cathode material comprising lithium nickel manganese cobalt oxide; and
   at least one additive dispersed within the base cathode material creating a dispersed mixture, the at least one additive comprising:
      a plurality of aluminum-CVD coated fibers having a diameter of from 3 microns to 20 microns, an aluminum-coating thickness between 0.1 micron and 3 microns; and a fiber length of from 0.1 mm to 1.0 mm; and
      the additive is dispersed into the active base cathode material in a loading weight range of 1% up to 10% of the active base battery cathode material.

5. The battery cathode of claim 4, wherein each fiber of the plurality of aluminum-CVD coated fibers is selected from the group of materials consisting of pan ox, silica, quartz, silicates, alumina, aluminosilicates, borosilicates, glass, minerals, nitrides, borides, polymers, cellulose, inorganic fibers, and organic fibers.

* * * * *